United States Patent [19]
Jeddeloh et al.

[11] Patent Number: 5,805,835
[45] Date of Patent: Sep. 8, 1998

[54] PARALLEL ARCHITECTURE COMPUTER SYSTEM AND METHOD

[75] Inventors: Joe Jeddeloh, Minneapolis, Minn.; Dean A. Klein, Lake City, Id.

[73] Assignee: Micron Electronics, Inc., Nampa, Id.

[21] Appl. No.: 679,834

[22] Filed: Jul. 15, 1996

[51] Int. Cl.$^6$ .................................................. G06F 13/00
[52] U.S. Cl. .......................................... 395/287; 395/299
[58] Field of Search .................................. 395/280, 299, 395/300, 294, 291, 287

[56] References Cited

U.S. PATENT DOCUMENTS

| | | | |
|---|---|---|---|
| 4,912,633 | 3/1990 | Schweizer et al. | 395/300 |
| 5,280,591 | 1/1994 | Garcia et al. | 395/291 |
| 5,396,602 | 3/1995 | Amini et al. | 395/283 |
| 5,404,538 | 4/1995 | Kyappweis, Sr. | 395/300 |
| 5,515,516 | 5/1996 | Fisch et al. | 395/294 |
| 5,581,782 | 12/1996 | Sarangdlar et al. | 395/299 |
| 5,594,882 | 1/1997 | Bell | 395/421.02 |
| 5,619,661 | 4/1997 | Crens et al. | 395/299 |

OTHER PUBLICATIONS

M. Morris Mano, *Computer System Architecture* (Second Edition), Prentice–Hall, Inc. 1982 pp. 406–415 and pp. 454–462.

*Primary Examiner*—Ayaz R. Sheikh
*Assistant Examiner*—David A. Wiley
*Attorney, Agent, or Firm*—Seed and Berry LLP

[57] ABSTRACT

A computer system, method, and controller bus agent for control access to a computer bus. The computer system includes a parallel architecture in which plural bus agents are directly coupled to the computer bus. Each bus agent includes plural bus requester ports each coupled to a different bus requester. As such, the computer system employs a relatively flat, parallel architecture that handles bus requests from the bus requesters in parallel. The controller bus agent includes an internal arbiter and an external arbiter. The internal arbiter arbitrates between bus requests received from the plural bus requesters coupled to the controller bus agent. The external arbiter arbitrates between the bus requests received from other bus agents and from the internal arbiter.

16 Claims, 5 Drawing Sheets

PARALLEL ARCHITECTURE COMPUTER SYSTEM AND METHOD

TECHNICAL FIELD

The present invention relates to computer architecture, and more particularly, to interfacing computer system components with a computer bus in an efficient manner.

BACKGROUND OF THE INVENTION

A computer system includes a set of interconnected components or modules of three basic types: central processing unit (CPU), memory, and input/output (I/O). The modules of the computer system are connected together by communication pathways known as busses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

As shown in FIG. 1, a typical prior art computer system 10 includes a tiered arrangement of computer modules. The computer system 10 includes a multiprocessor system architecture in which first and second computer processors 12, 14 are each coupled to a processor bus 16. The computer system 10 also includes a bus agent 18 that interfaces computer system modules to the processor bus 16. Coupled to the bus agent 18 is a main memory 20, such as random access memory (RAM) and/or read-only memory (ROM). Also coupled to the bus agent 18 is a Peripheral Component Interconnect (PCI) bus 22 which is coupled to a PCI/ISA bridge 24 and a video controller 26. The PCI/ISA bridge 24 interfaces an Industry Standard Architecture (ISA) bus with the PCI bus 22. Coupled to the ISA bus 28 are a hard drive 30 and a fax/modem 32.

A major problem with the tiered architecture of prior art computer systems, such as the computer system 10 shown in FIG. 1, is that such computer systems are unable to keep pace with the ability of the computer system modules to generate requests for use of the processor bus 16. The speed of the computer system 10 is limited by the bottleneck created at each tier of the computer system. For example, for the hard drive 30 to transmit a transaction to the computer processor 12, the hard drive must first arbitrate with the fax/modem 32 for use of the ISA bus 28. After gaining access to the ISA bus 28, the transaction from the hard drive 30 is passed to the PCI/ISA bridge 24. The PCI/ISA bridge 24 arbitrates with the video controller 26 for use of the PCI bus 22. After gaining access to the PCI bus 22, the PCI/ISA bridge 24 transmits the transaction from the hard drive 30 to the bus agent 18 via the PCI bus as a bus request for use of the processor bus 16. The bus agent 18 then arbitrates between the bus request from the PCI bus 22 and any bus request from the memory 20 and selects one of the bus requests for transmission of its associated transaction on the processor bus 16. As a result, a single transaction from the hard drive 30 must undergo arbitration for use of three separate computer buses in order for the transaction to reach the processor 12. Moreover, the transaction from the hard drive 30 prevents the main memory 20, video controller 26, and fax/modem 32 from using the processor bus 16, PCI bus 22, and ISA bus 28.

An alternate prior art computer system 40 is shown in FIG. 2. The computer system 40 shown in FIG. 2 is substantially identical to the computer system 10 shown in FIG. 1, except that the computer system 40 includes a second bus agent 42. The second bus agent 42 couples the main memory 20 to the processor bus 16. Such an arrangement does not greatly effect the speed of the computer system because bus requests from the memory 20 or the PCI bus 22 still have to be arbitrated before being transmitted on the processor bus 16. The difference is that the arbitration is performed between the first bus agent 18 and the second bus agent 40 in FIG. 2 rather then within the first bus agent 18 as in FIG. 1. Moreover, the bus agent 18, PCI bus 22, PCI/ISA bridge 24, video controller 26, ISA bus 28, hard drive 30 and fax/modem 32 are still arranged in a tiered structure. Accordingly, the computer system 40 shown in FIG. 2 suffers from the same speed drawbacks as the computer system 10 shown in FIG. 1.

SUMMARY OF THE INVENTION

The present invention is directed to a computer system, method, and controller bus agent for controlling access to a computer bus. The computer system includes at least three bus requesters from which transactions are transmitted to the computer bus. A first bus agent is coupled to the computer bus and to one or more of the bus requesters. The computer system also includes a second bus agent coupled to the computer bus. The second bus agent includes a plurality of bus requester ports, with each bus requester port being coupled to one of the bus requesters. As such, the computer system includes a relatively flat architecture by employing plural bus agents and plural bus requesters coupled to separate ports of at least one of the bus agents. Such a relatively flat architecture enables the computer system to handle bus requests in parallel rather than the serial, tiered approach of the prior art.

The controller bus agent of the present invention controls access to the computer bus of the computer system. The controller bus agent preferably includes an internal arbiter structured to receive bus requests from each of a plurality of bus requesters and select one of the bus requests based on an internal arbitration algorithm. The controller bus agent also includes an external arbiter coupled to the computer bus, the internal arbiter, and another bus agent. The external arbiter is structured to arbitrate between the bus request selected by the internal arbiter and a bus request received from the other bus agent such that the external arbiter selects one of the bus requests for transmission on the computer bus. Employing a controller bus agent with internal and external arbiters enables the computer system to have a relatively flat architecture rather than the tiered architecture of the prior art computer systems.

The method of the present invention also controls access to the computer bus of the computer system. The method receives bus requests from each of a plurality of bus requesters at a controller bus agent. The controller bus agent selects one of the bus requests received from the bus requesters based on an internal arbitration algorithm. The controller bus agent also receives a bus request from another bus agent. The method includes arbitrating between the bus request selected by the internal arbiter and the bus request received from the other bus agent such that one of the bus requests is selected for transmission on the computer bus.

DETAILED DESCRIPTION OF THE INVENTION

Figure 3:
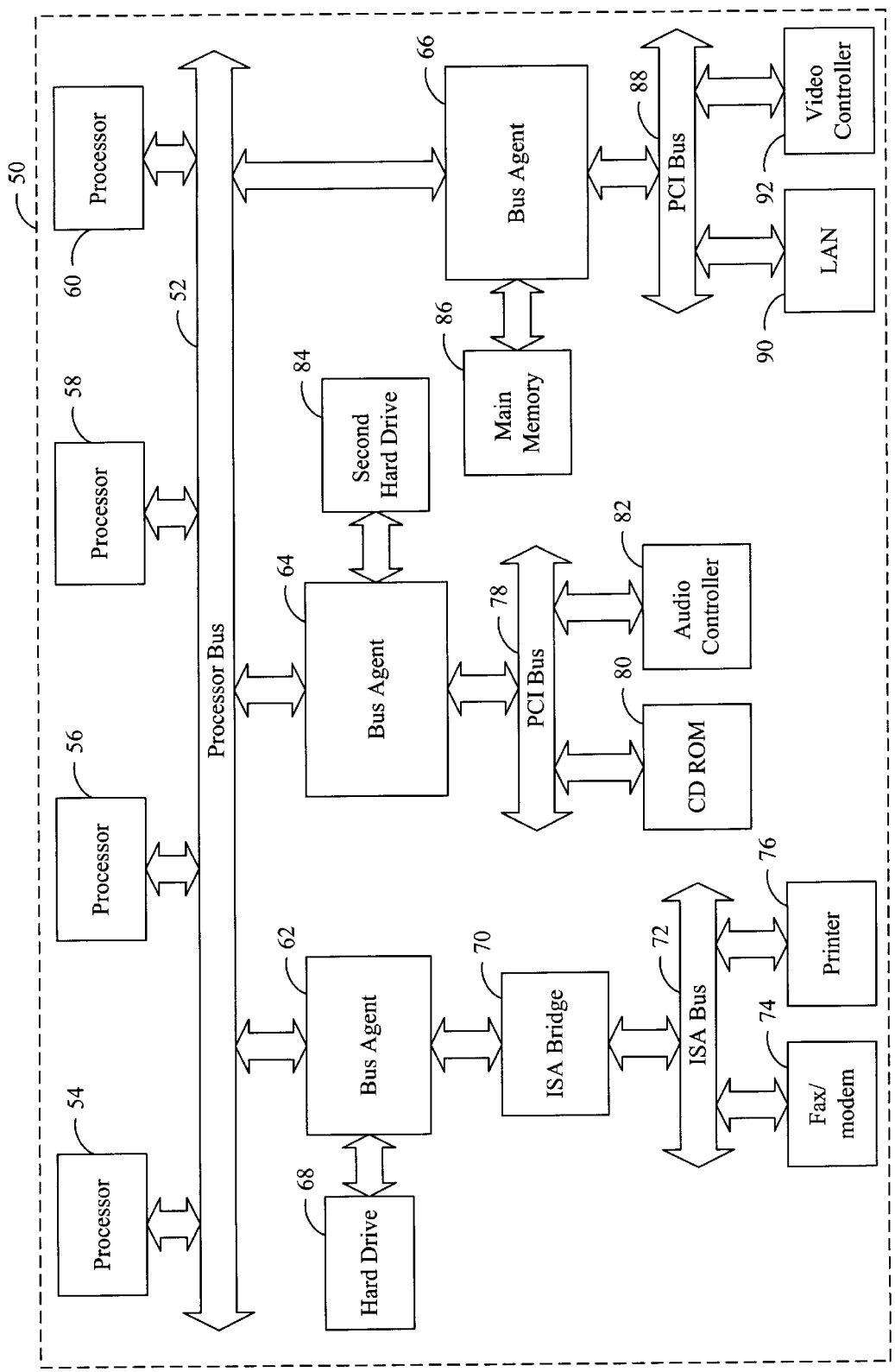
FIG. 3 is a block diagram of a computer system according to the present invention.

Shown in FIG. 3 is a preferred embodiment of a computer system 50 that controls access to a processor bus 52 according to the present invention. The computer system 50 includes a multiprocessor system architecture in which first through fourth computer processors 54, 56, 58, 60 are each coupled to the processor bus 52. The computer processors 54–60 each request use of the processor bus 52 as necessary and are known as symmetric bus agents. The computer processors 54–60 are referred to as "symmetric" because each computer processor has the same priority, that is, they equally share the computer bus 52. Each of the processors 54–60 can be any of numerous known computer processors, such as the Intel Pentium Pro™ processor. It will be appreciated that the invention also is applicable to computer systems employing more or fewer processors.

The computer system 50 includes three priority bus agents: a first bus agent 62, a second bus agent 64, and a third bus agent 66. The first, second, and third bus agents 62–66 are called "priority" bus agents because each of the priority bus agents has priority over the symmetric bus agents 54–60 for use of the processor bus 52. It will be appreciated that the bus agents 62–66 need not have priority over the symmetric bus agents 54–60 and the computer system 50 could include any plural number of bus agents.

The computer system 50 also includes plural bus requesters coupled to each of the bus agents 62–66. Each bus requester is a computer system element or module from which a bus request for use of the processor bus 52 is transmitted. Coupled to the first bus agent 62 is a first hard drive 68 and an ISA bridge 70. Coupled to the ISA bridge 70 via an ISA bus 72 are two bus requesters: a fax/modem 74 and a printer 76. Coupled to the second priority bus agent 64 via a Peripheral Component Interconnect (PCI) bus 78 are two more bus requesters: a CD ROM drive 80 and an audio controller 82. Also coupled to the second priority bus agent 64 is a second hard drive 84. Directly coupled to the third priority bus agent 66 are a main memory 86 and a second PCI bus 88 which is coupled to a local area network 90 and a video controller 92. It will be appreciated that the particular modules shown as bus requesters 68–92 are exemplary only and numerous other types and numbers of bus requesters could be employed without departing from the invention.

Figure 1:
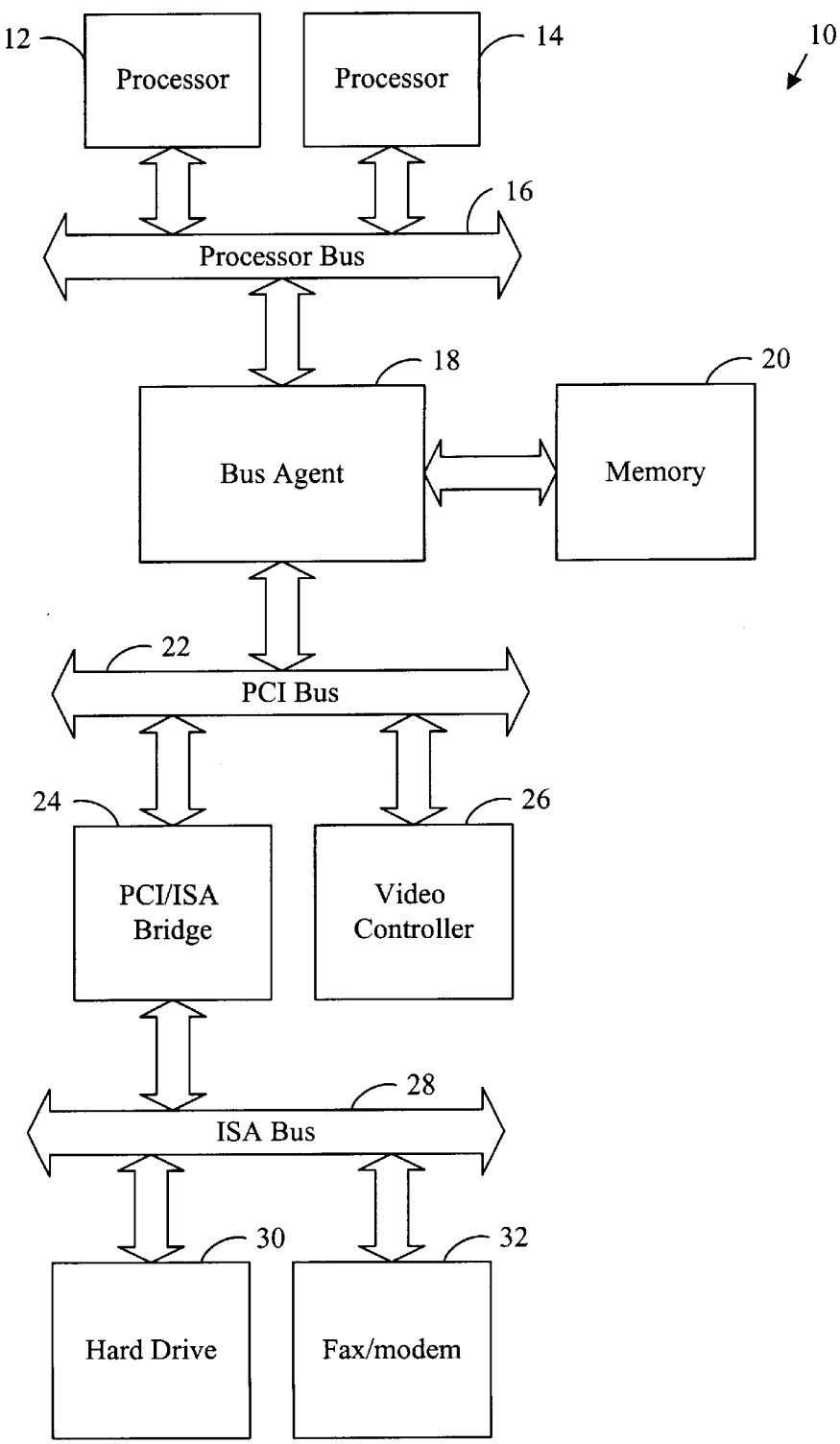
FIG. 1 is a block diagram of a prior art computer system.
Figure 2:
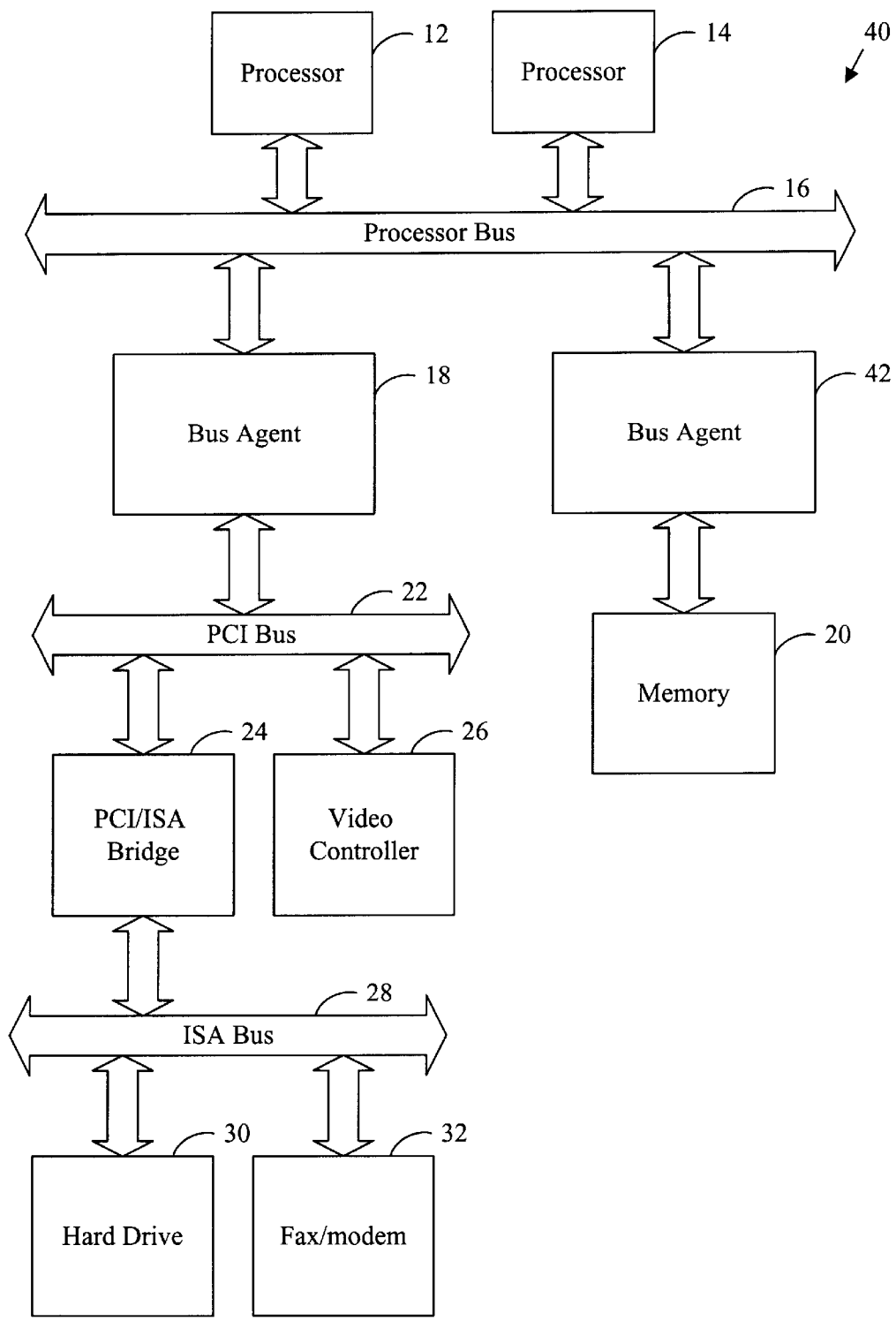
FIG. 2 is a block diagram of an alternate prior art computer system.

By employing plural bus agents 62–66 with plural bus requesters coupled to each bus agent, the computer system 50 provides a more efficient, parallel architecture than prior art computer systems, such as the computer system shown in FIGS. 1 and 2. The architecture of the computer system 50 is parallel in that bus requests can be transmitted in parallel to the bus agents 62–66. As such, each bus requester 68–92 is coupled more closely to the processor bus 52. As a result, each bus requester 68–92 arbitrates with fewer other bus requesters in order to transmit a transaction on the processor bus 52. For example, the first hard drive 68 need only go through one level (i.e., the first priority bus agent 62) to reach the processor bus 52. This contrasts with the prior art computer systems shown in FIGS. 1 and 2 in which the hard drive 30 must go through the ISA bus 28, a PCI/ISA bridge 24, the PCI bus 22, and the bus agent 18 in order to reach the processor bus 16.

Moreover, the parallel architecture of the computer system 50 reduces the chances that a bus request from one bus requester 68–92 will block a bus request from one of the other bus requesters. For example, a bus request from the first hard drive 68 does not prevent any of the other bus requesters 70–92 from simultaneously transmitting bus requests to one of the bus agents 62–66. In other words, while the first hard drive 68 is transmitting a bus request to the first bus agent 62, any of the other bus requesters 70–92, such as the fax/modem 74, can simultaneously submit a bus request to the appropriate bus agent 62–66. In contrast, while the hard drive 30 of the prior art computer systems 10, 40 shown in FIGS. 1 and 2 is transmitting a bus request to the bus agent 18, the fax/modem 32 cannot transmit a bus request past the ISA bus 32 to the bus agent 18.

Figure 4:
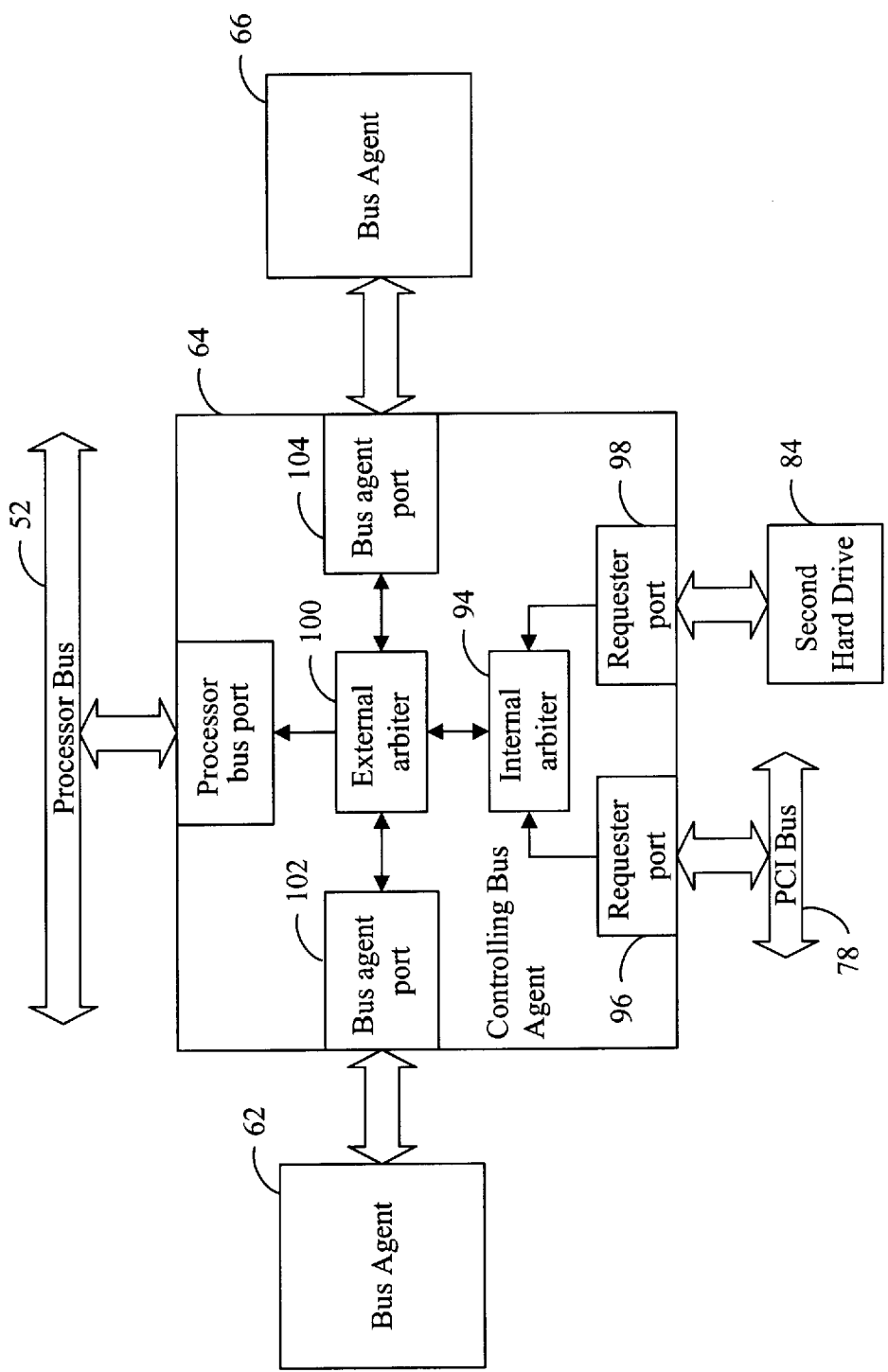
FIG. 4 is a block diagram of a controlling bus agent used in the computer system shown in FIG. 3.

Shown in FIG. 4 is a block diagram of a preferred embodiment of the second bus agent 64. The second bus agent 64 includes an internal bus arbiter 94 that arbitrates between bus requests received from the PCI bus 78 and the second hard drive 84. The internal bus arbiter 94 receives bus requests from the PCI bus 78 via a first requester port 96 and receives bus requests from the second hard drive 84 via a second requester port 98. The internal bus arbiter 94 can employ any well known arbitration algorithm (e.g., priority, rotating) to select one of the bus requests from the PCI bus 78 and the main memory 84 for transmission on the processor bus 52.

The second bus agent 64 also includes an external bus arbiter 100 that arbitrates between bus requests from the first bus agent 62, the third bus agent 66, and the internal bus arbiter 94. Coupled to the external arbiter 100 is a first bus agent port 102 that receives a bus request from the first bus agent 62. Also coupled to the external arbiter 100 is a second bus agent port 104 that receives a bus request from the third bus agent 66.

The external arbiter 100 arbitrates between the bus requests received via the first bus agent port 102, the second bus agent port 104, and the internal arbiter 94. If the external arbiter 100 selects the bus request received via the first bus agent port 102, then the external arbiter sends a bus grant signal to the first bus agent 62 via the first bus agent port 102. In response to the bus grant signal, the first bus agent 62 transmits on the processor bus 52 the transaction corresponding to the selected bus request. Similarly, if the external arbiter 100 selects the bus request signal received via the second bus request port 104, then the external arbiter sends a bus grant signal to the third bus agent 66 via the second bus agent port 104. In response, the third bus agent 66 transmits on the processor bus 52 the transaction corresponding to the selected bus request. If the external arbiter 100 selects the bus request from the internal arbiter 94, then the external arbiter transmits on the processor bus 52 the transaction corresponding to the selected bus request. In addition, the external arbiter 100 informs the internal arbiter 94 that the internal arbiter can select a new bus request from the PCI bus 78 or the main memory 84.

Although FIG. 4 shows a block diagram of a preferred embodiment of the second bus agent 64, it will be appreciated that the first and third bus agents 62, 66 may have a structure identical to that shown in FIG. 4. In particular, each of the first and third bus agents 62, 66 preferably includes an internal arbiter and plural bus requester ports substantially similar to the internal arbiter 94 and the bus requester ports 96, 98 shown in FIG. 4. Such an internal arbiter and plural bus requester ports enables each of the bus agents 62–66 to simultaneously receive bus requests from plural bus requesters. Only one of the bus agents 62–66 needs to have an external arbiter like the external arbiter 100 shown in FIG. 4, but it is not important which of the bus agents includes the external arbiter. Alternatively, a distributed arbitration scheme can be employed in which the bus agents 62–66 share the external arbitration responsibilities. In such an alternative embodiment, each bus agent 62–66 would include external arbitration logic that enables all three bus agents to agree on which bus agent is selected to transmit the next bus transaction.

Figure 5:
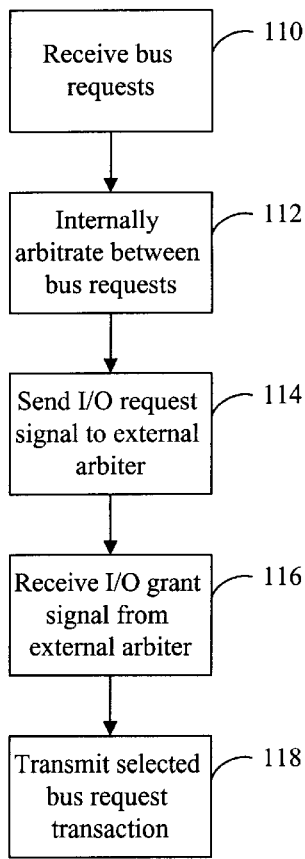
FIG. 5 is a flow diagram of a method performed by a bus agent according to the present invention.

Shown in FIG. 5 is a flow diagram of a method performed by either of the first and third bus agents 62, 66 to receive and respond to bus requests from the bus requesters 68–76, 86–92. In step 110, the bus agent receives one or more bus requests from one of the bus requesters. In step 112, an internal arbiter of one of the bus agents 62, 66 internally arbitrates between the bus requests received in step 110. In step 114, the bus agent sends a bus request to the external arbiter 100. In step 116, the bus agent receives a bus grant signal from the external arbiter 100 when the external arbiter selects the bus request of the bus agent during external arbitration. In step 118, the bus agent transmits on the processor bus 52 the bus transaction corresponding to the selected bus request.

Figure 6:
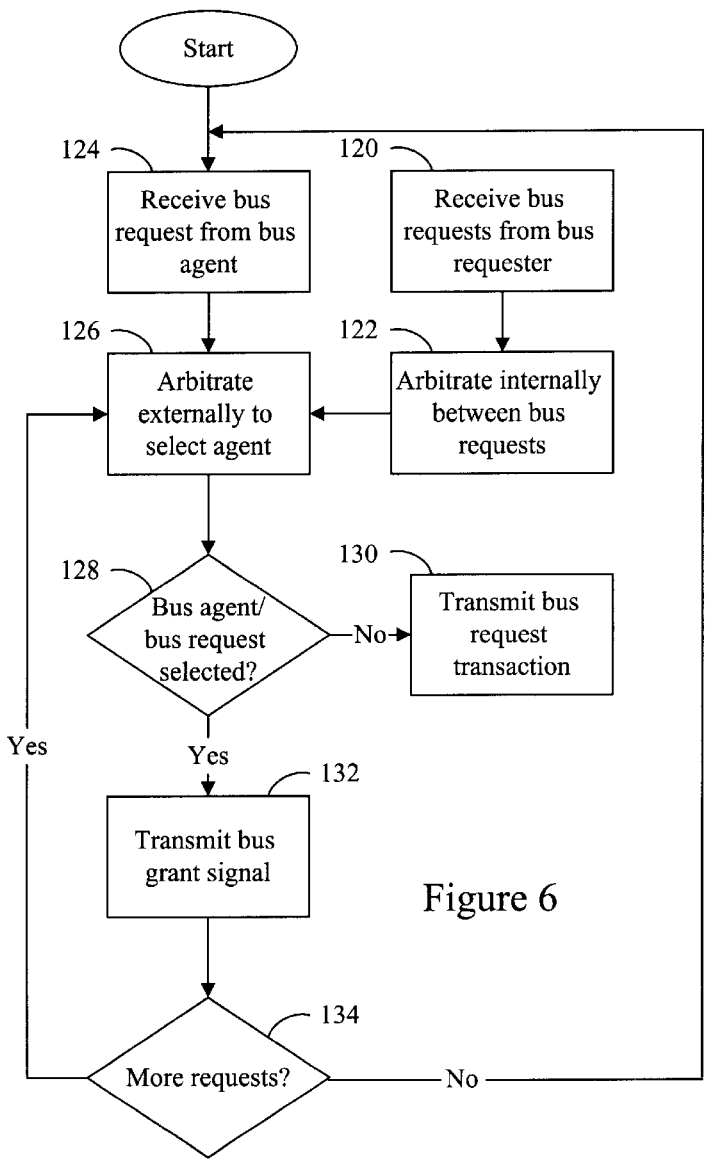
FIG. 6 is a flow diagram of a method employed by a controller bus agent according to the present invention.

Shown in FIG. 6 is a method performed by the controller bus agent 64 to respond to bus requests from the first and third bus agents 62, 66 or bus requests from the bus requesters 78, 84 connected directly to the controller bus agent. In step 120, the internal arbiter 94 receives a bus request from each of the bus requesters 78, 84. In step 122, the internal arbiter 94 arbitrates internally between the bus requests received in step 120 and selects one of the bus requests for external arbitration by the external arbiter 100. In step 124, the external arbiter receives one or more bus requests from one or more of the priority bus agents 62, 66. In step 126, the external arbiter 100 externally arbitrates between the bus requests received in step 124 and the bus request selected in step 122. In step 128, the external arbiter 100 determines whether a bus request from one of the priority bus agents 62, 66 was selected. If not, then the external arbiter 100 must have selected the bus request from the internal arbiter 94 and the external arbiter transmits on the processor bus 52 the transaction corresponding to the selected bus request in step 130. If a bus request from one of the bus agents 62, 66 was selected, then in step 132 the external arbiter 100 transmits a bus grant signal to the bus agent that transmitted the selected bus request. The bus grant signal transmitted in step 132 causes the priority bus agent to transmit the transaction corresponding to the selected bus request in step 118 of FIG. 5.

After transmitting the transaction corresponding to a selected bus request from the internal arbiter 94 in step 130 or transmitting the bus grant signal in step 132, the external arbiter 100 determines whether there are any more bus requests from the bus agents 62, 66 or from the internal arbiter 94 in step 134. If so, then the method repeats steps 128 and 130 or 128 and 132 for the remaining bus requests. When the external arbiter 100 determines, in step 134, that there are no more bus requests, then the external arbiter 100 waits until new bus requests are received from the bus requesters 78, 84 in step 120 or new bus requests are received from the priority bus agents 62, 66 in step 124.

Based on the foregoing discussion, it will be appreciated that the present invention provides a computer system, method, and controller bus agent that more efficiently couple bus requesters to a computer bus. In particular, the computer system includes a relatively flat architecture that processes bus requests from bus requesters in parallel. Such a parallel approach reduces the ability of slower bus requesters to limit the speed of faster bus requesters by clogging the pathway to the computer bus. Further, by reducing the number of tiers or levels that a bus request needs to traverse in order to reach the computer bus, the present invention increases the speed in which each bus request is processed.

It should be understood that even though numerous advantages of the present invention have been set forth in the foregoing description, the above disclosure is illustrative only. Changes may be made in detail and yet remain within the broad principles of the present invention.

We claim:

1. A computer system, comprising:

a computer bus, a processor coupled to the computer bus;

at least four bus requesters from which transactions are transmitted to the computer bus; and a plurality of bus agents coupled to the computer bus, each bus agent including a plurality of bus requester ports, each bus requester port being coupled to one of the bus requesters such that each bus agent enables the transactions from a plurality of the bus requesters to be transmitted on the computer bus, each of the plurality of bus agents including an internal arbiter that selects one of the bus requests received from the plurality of bus requesters coupled to the bus agent, wherein a first one of the plurality of bus agents includes an external arbiter structured to receive a bus request from a second one of the plurality of bus agents and arbitrate between the bus request from the second bus agent and the bus request selected by the internal arbiter.

2. The computer system of claim 1 wherein one of the bus requesters coupled to a first one of the bus agents is a first PCI bus and one of the bus requesters coupled to a second one of the bus agents is a second PCI bus such that each of the first and second PCI busses can transmit bus requests to their respective bus agents simultaneously.

3. The computer system of claim 1 wherein a first one of the plurality of bus agents includes an external arbiter structured to receive bus requests from a second one and a third one of the plurality of bus agents and arbitrate between the bus requests received from the second and third bus agents.

4. The computer system of claim 1 wherein a first one of the plurality of bus agents includes:

a first bus agent port coupled to a second one of the plurality of bus agents; and an external arbiter structured to receive a bus request from the second bus agent via the first bus agent port and respond by transmitting to the second bus agent a bus grant signal via the first bus agent port.

5. The computer system of claim 4 wherein the first bus agent includes a second bus agent port coupled to a third one of the plurality of bus agents and the external arbiter is structured to arbitrate between the bus requests from the second and third bus agents before transmitting the bus grant signal to the second bus agent.

6. The computer system of claim 1 wherein one of the bus requesters is an ISA bus coupled to one of the bus agents without an expansion bus between the bus requester and the ISA bus.

7. A computer system, comprising:

a computer bus;

a processor coupled to a computer bus;

at least four bus requesters from which transactions are transmitted to the computer bus;

a first bus agent having a bus port directly coupled to the computer bus and having first and second bus requester ports coupled respectively to first and second bus requesters of the bus requesters; and a second bus agent having a bus port directly coupled to the computer bus, the second bus agent including first and second bus requester ports coupled respectively to third and fourth bus requesters of the bus requesters such that the first and second bus agents each enable transactions from a plurality of the bus requesters to be transmitted on the computer bus, wherein the second bus agent includes an internal arbiter that selects for transmission on the computer bus, one of the bus requests received from the plurality of bus requesters coupled to the second bus agent and includes an external arbiter structured to receive a bus request from the first bus agent and arbitrate between the bus request from agent and the bus request selected by the internal arbiter.

8. The computer system of claim 7 wherein one of the bus requesters coupled to a first one of the bus agents is a first high-speed bus and one of the bus requesters coupled to a second one of the bus agents is a second high-speed bus such that each of the first and second high-speed busses can transmit bus requests to their respective bus agents simultaneously.

9. The computer system of claim 7 wherein the second bus agent includes an internal arbiter that selects, for transmission on the computer bus, one of the bus requests received from the plurality of bus requesters coupled to the second bus agent.

10. The computer system of claim 7 wherein the first bus agent includes an external arbiter structured to receive a bus request from the second bus agent and arbitrate between the bus request received from the second bus agent and a bus request received from the bus requester coupled to the first bus agent.

11. The computer system of claim 7 wherein the first bus agent includes:

a first bus agent port coupled to the second bus agent; and an external arbiter structured to receive a bus request from the second bus agent via the first bus agent port and respond by transmitting to the second bus agent a bus grant signal via the first bus agent port.

12. The computer system of claim 11 wherein the first bus agent includes a second bus agent port coupled to a third bus agent and the external arbiter is structured to arbitrate between the bus requests from the second and third bus agents before transmitting the bus grant signal to the second bus agent.

13. A method for controlling access to a computer bus of a computer system, the method comprising:

receiving bus requests from each of a plurality of bus requesters at a controlling bus agent;

selecting one of the bus requests received from the bus requesters based on an internal arbitration algorithm, the bus requested that submitted the selected bus request being a selected bus requester;

receiving a bus request at the controlling bus agent from another bus agent;

arbitrating, based on an external arbitration algorithm between the bus request selected based on the internal arbitration algorithm and the bus request received from the other bus agent such that one of the bus requests is selected; and if the bus request selected based on the external arbitration algorithm is the bus request selected based on the internal arbitration algorithm, then the controlling bus agent transmits on the computer bus a bus transaction corresponding to the selected bus request from the selected bus requester.

14. The method of claim 13, further comprising transmitting a bus grant signal to the other bus agent in response to selecting the bus request from the other bus agent during the arbitrating step.

15. The method of claim 14, further comprising:

receiving the bus grant signal at the other bus agent; and in response to receiving the bus grant signal, transmitting on the computer bus a transaction corresponding to the bus request sent by the other bus agent.

16. The computer system of claim 1 wherein each of the first and second bus agents is structured to transmit transactions on the computer bus from the bus requesters coupled to the bus agent in response to the internal arbiter of the bus agent selecting bus requests corresponding to the transactions.

* * * * *